United States Patent [19]

Redd et al.

[11] Patent Number: 5,145,543
[45] Date of Patent: Sep. 8, 1992

[54] COMBINATION FILAMENT WINDING AND TAPE LAYING APPARATUS AND METHOD FOR MAKING AND USING THE SAME

[75] Inventors: Bryan Redd, North Logan; Mark L. Enders, North Ogden; Michael H. Young; William T. Dolling, both of Brigham City, all of Utah

[73] Assignee: Thiokol Corporation, Ogden, Utah

[21] Appl. No.: 616,756

[22] Filed: Nov. 16, 1990

Related U.S. Application Data

[63] Continuation of Ser. No. 338,602, Apr. 14, 1989, abandoned.

[51] Int. Cl.$^5$ .................... B65H 81/00; B31C 13/00
[52] U.S. Cl. .................................. 156/171; 156/169; 156/172; 156/173; 156/175; 156/425; 156/429; 156/433; 156/187
[58] Field of Search ............... 156/169, 171, 172, 173, 156/175, 425, 427, 428, 429, 191, 187, 250, 264, 289, 510, 512, 517, 519, 523, 574, 433, 441; 242/7.29

[56] References Cited

U.S. PATENT DOCUMENTS

| | | |
|---|---|---|
| 2,608,720 | 9/1952 | Meissner . |
| 3,380,675 | 4/1968 | Baxter et al. ............... 242/7.21 |
| 3,470,051 | 9/1969 | Meyer . |
| 3,573,123 | 3/1971 | Siegel et al. . |
| 3,616,078 | 10/1971 | Howard ..................... 242/7.21 X |
| 3,748,203 | 7/1973 | Greene . |
| 3,775,219 | 11/1973 | Karlson et al. .................. 156/363 |
| 3,796,620 | 3/1974 | Dunn ............................. 156/171 |
| 3,886,029 | 3/1975 | Poulsen . |
| 4,078,957 | 3/1978 | Bradt . |
| 4,264,278 | 4/1981 | Weingart ................. 416/230 A X |
| 4,459,171 | 7/1984 | McKinney . |
| 4,565,595 | 1/1986 | Whitener ..................... 156/172 X |
| 4,574,029 | 3/1986 | Murray . |
| 4,596,619 | 6/1986 | Marks . |
| 4,746,393 | 5/1988 | Ephere et al. ................ 156/173 X |
| 4,750,960 | 6/1988 | Bubeck . |
| 4,772,352 | 9/1988 | Kornbichler . |
| 4,790,898 | 12/1988 | Woods . |
| 4,797,172 | 1/1989 | Hebert et al. . |

OTHER PUBLICATIONS

Advertisement "Filament Winding/Tape Layup" of Lunn Industries, Inc., May 15, 1986.
"Two-Stage Tape Placement Machine" by Ewald, 40th Annual Conference, Reinforced Plastics/Composites Institute, The Society of The Plastic Industry, Inc., Jan. 28-Feb. 1, 1985.
"Automated Tape Laying" by Klein, Advanced Composites, Jan./Feb., 1989, pp. 44-52.
Brochure "Automated Machinery for Composite Manufacturing" of The Ingersoll Milling Machine Company of Rockford, Ill.
1985 Brochure "Multi-Axis Composite Tape-Laying CNC Machine of Cincinnati Malcron".
a 3M brochure titled "The AccuGlide TM Taping Head from 3M".
Vektronics Incorporated Brochure.

*Primary Examiner*—Michael W. Ball
*Assistant Examiner*—Jeff H. Aftergut

[57] ABSTRACT

A combination filament winding and tape laying apparatus and method for applying matrix impregnated fibrous material to a generally cylindrical mandrel which is rotated about its cylindrical axis in a stationary horizontal position. A filament winding head is moved horizontally along the length of the mandrel by a carriage for filament winding. A platform is attached to the carriage. A tape applying head is mounted on the platform for applying tape whereby it is unnecessary to move the mandrel from a filament winding machine to a tape laying machine when both operations are required. The tape laying head is preferably portable.

6 Claims, 2 Drawing Sheets

COMBINATION FILAMENT WINDING AND TAPE LAYING APPARATUS AND METHOD FOR MAKING AND USING THE SAME

This is a continuation of copending application Ser. No. 07/338,602 filed on Apr. 14, 1989, now abandoned.

The present invention relates generally to the fabrication of articles from a matrix impregnated fibrous material.

In order to fabricate a composite product such as a composite rocket motor case, fibrous material, impregnated with a resin or other matrix material, usually is applied to a mandrel in accordance with one or more techniques such as by filament winding and/or tape laying or hand lay-up.

In a typical filament winding machine, a carriage carrying a filament winding head is caused to move horizontally along tracks or ways to apply filaments of matrix impregnated fibrous material to a horizontal rotating stationary mandrel. Vertical filament winding machines are also known.

In a tape laying or applying machine, tape is provided which comprises a strip of matrix impregnated fibrous material wherein filaments of the fibrous material are oriented at a predetermined angle so as to be oriented at a predetermied angle in the composite product formed thereby. the term "tape", as used in this specification and in the claims, is meant to refer to a band of matrix impregnated fibrous material wherein the filaments thereof are oriented at a predetermined angle in the band.

In the manufacture of solid propellant rocket motors, a composite case and the composite domes thereof are typically filament wound whereby the filaments of matrix impregnated fibrous material are applied from end to end and over the dome at each end as the mandrel is rotated and the filament winding head is moved horizontally along the ways. After the case and domes have been wound, it may be desirable to provide a composite skirt over each of the domes. In order that the skirts may have adequate axial strength, the filaments of fibrous material therein may desirably be oriented at low winding angles of perhaps 0° and 45° relative to the longitudinal axis. Such angles are achievable with filament winding by filament winding over the entire length of the rocket motor and then removing the resultingly excess material in the middle between the skirts. Such excess material undesirably constitutes a waste of material. In addition, a similar problem may occur with other parts of a rocket motor which may also require high axial stiffness. Typically, the method of fabrication for skirts and localized build-ups on filament wound parts for axial stiffness and increased buckling strengths has been by hand application wherein a "kit" is made up from a roll of tape to the particular angle desired. However, such a process is undesirably labor intensive, slow, and therefor expensive as well as susceptible to error.

A more preferred way of applying the filamentary material to the skirt mandrels is by use of a tape laying head wherein the filaments in the tape are oriented at a predetermined angle. Filament winding machines are also typically limited to helicals at angles of perhaps 20 to 90 degrees relative to the longitudinal axis and have to incorporate fiber holding pins to keep the filaments from slipping. A tape laying head may advantageously increase the fiber angle range by utilizing in-process compaction of the tape onto the mandrel. However, in order to move the rocket motor mandrel from the filament winding machine to a tape laying machine, a full day may undesirably perhaps be required, and there is risk of dropping it. Furthermore, after the skirts are fabricated, it is usually desirable to more securely tie the skirts and case together by a layer of fibrous material over the length of case and including the skirts. However, this would require the movement of the mandrel from the tape laying machine back to the filament winding machine which may undesirably require another full day and the additional risk of dropping the mandrel and case.

It is therefore an object of the present invention to provide an apparatus and method for applying matrix impregnated fibrous material to a mandrel wherein the fibrous material may be filament wound and laid as tape on the mandrel without the necessity of movement of the mandrel from one machine to another.

It is another object of the present invention to provide a means for converting a plurality of filament winding machines for tape laying as well as filament winding at a minimum of additional expense.

In order to achieve the above objects in accordance with the present invention, a platform means is attached to the carriage means for the filament winding head, and a tape laying head is mounted on the platform means so that the tape laying head is movable along the ways simultaneously as the carriage is moved along the ways. In order to minimize the number of tape laying heads required for a plurality of filament winding machines, in accordance with a preferred embodiment the tape laying head is removably mounted on the platform means so that it is portable.

The above and other objects, features, and advantages of this invention will be apparent in the following detailed description of the preferred embodiments thereof which is to read in connection with the accompanying drawings.

In the drawings:

FIG. 1 is a prespective view of apparatus embodying the present invention wherein a tape laying head thereof is shown applying tape to a mandrel; and FIG. 2 is a view similar to that of FIG. 1 wherein a filament winding head is shown applying filaments of fibrous material to the mandrel.

DETAILED DESCRIPTION OF THE PREFERRED EMBODIMENTS

Figure 1:
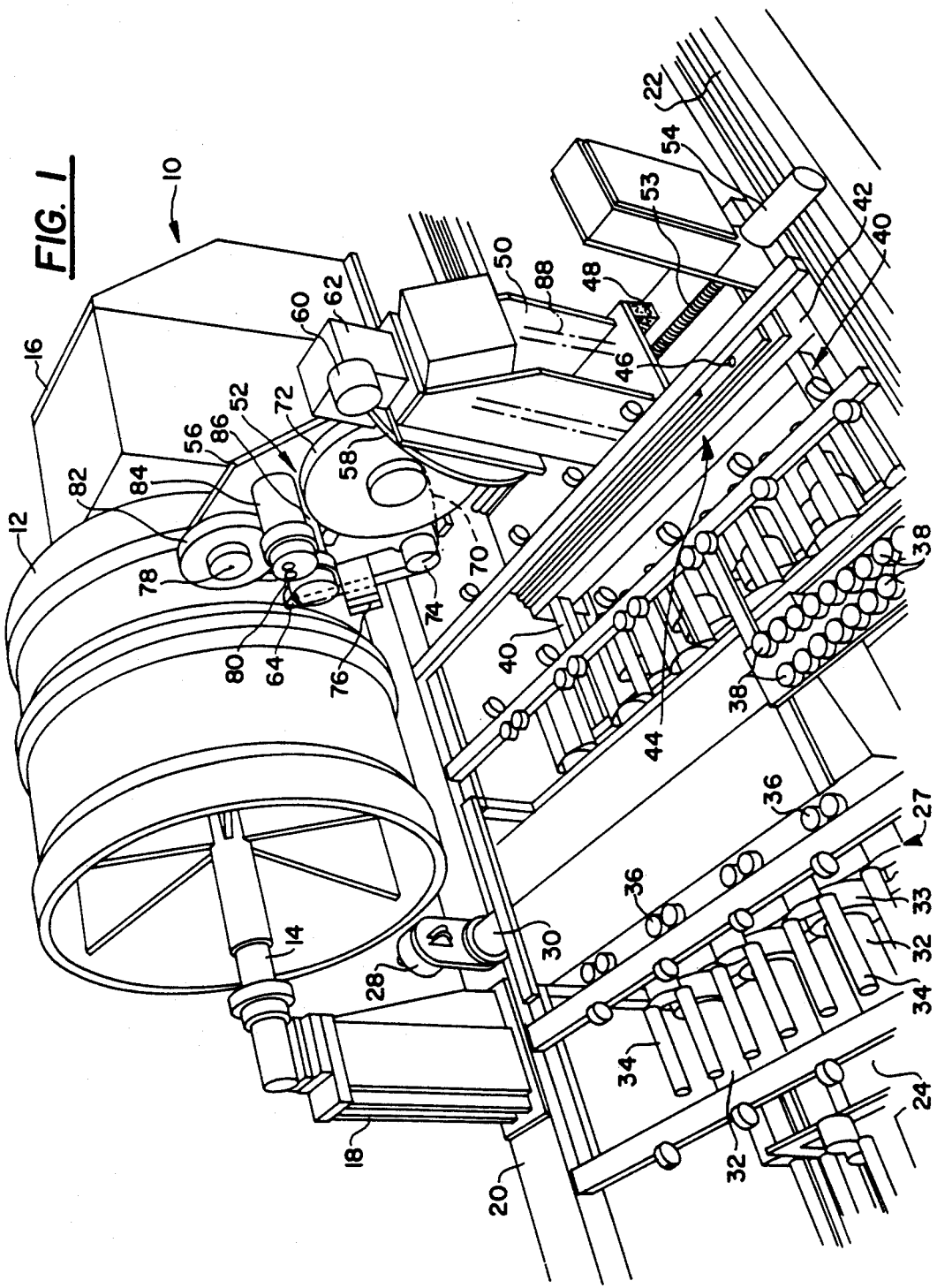

Referring to the drawings, there is shown generally at 10 apparatus which embodies the present invention. Apparatus 10 may be used for the fabrication of any number of composite products such as, for example, pressure vessels, rocket motors, structural tubing, radar radomes, and aircraft fuselages and components. At 12 is shown a generally cylindrical elongate stationary mandrel which is rotatable about its longitudinal axis or shaft 14 for application of matrix impregnated fibrous material, such as filaments 26 in FIG. 2 or tape 70 in FIG. 1, thereto to fabricate a composite component such as, for example, a rocket motor case. The shaft 14 is rotatably engaged by head stock 16 and rotatably supported by tail stock 18 which is mounted on support 20 using principles commonly known to those of ordinary skill in the art to which this invention pertains.

A pair of parallel tracks or ways 22 are provided for movement of filament winding apparatus 27 including carriage 24 along the length of the mandrel 12 for application of matrix impregnated fibrous material thereto. Thus, when mounted between the head stock 16 and tail stock 18, the shaft 14 of the mandrel 12 is generally parallel to the ways 22.

Figure 2:
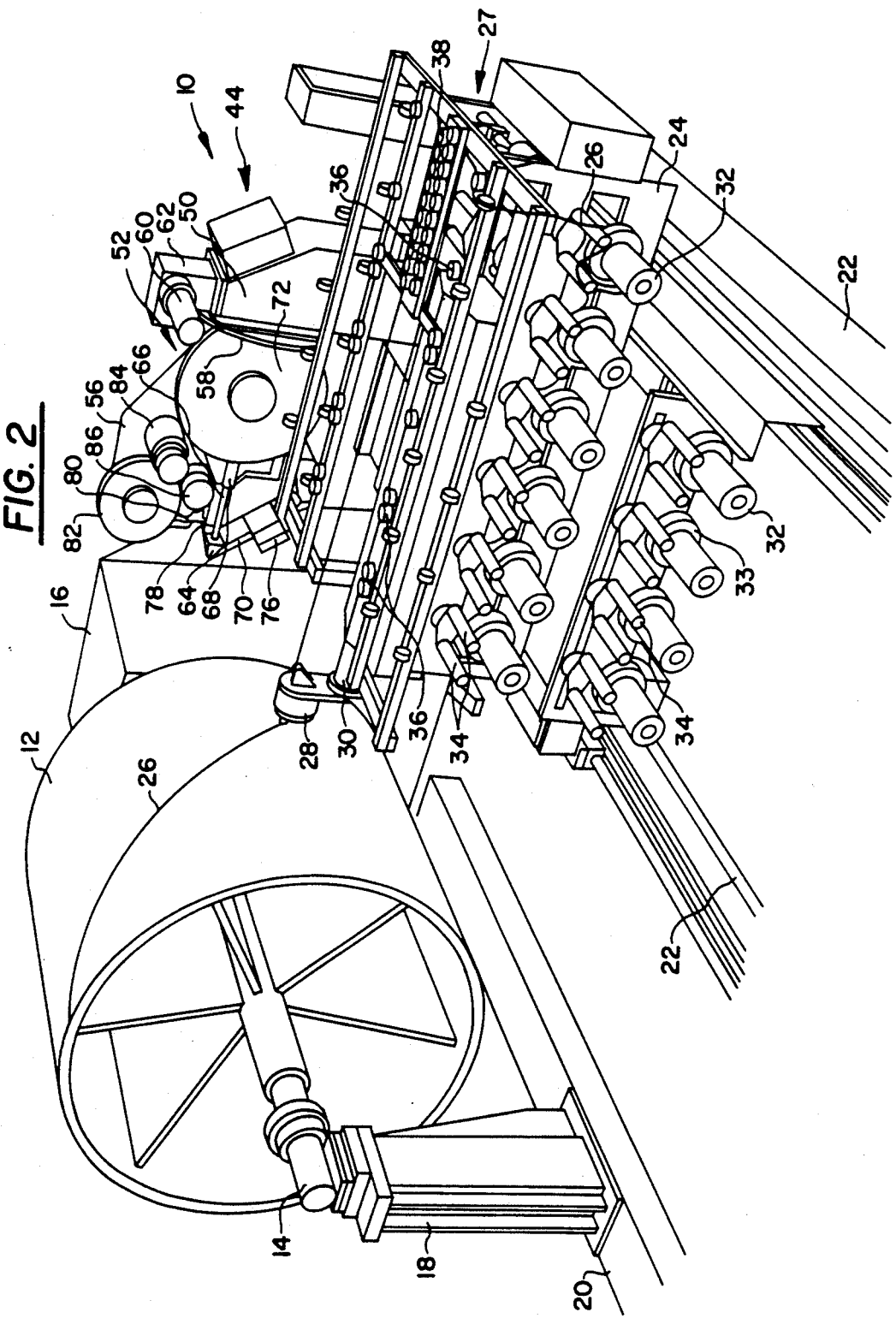

A plurality of filaments one of which is shown at 26 in FIG. 2 are applied to the mandrel 12 as it is rotated from a filament winding head 28, which is preferably castered so as to seek its own natural orientation to the mandrel 12 is movable toward and away from the mandrel 12 by means of shaft 30 which is suitably powered.

The fibrous material 26 is supplied from spools (not shown) which are mounted on shafts 32. Each shaft 32 has an associated pair of tensioning devices 33 which provide a tension to the filaments 26 of perhaps 10 to 15 pounds each. After passing through spring loaded dancing bars 34, which allow more uniform unwinding, the filaments 26 are routed through an individual pair of guide wheels 36 and then through a series of adjustable guide wheels 38 which direct the filaments appropriately to the castered delivery head 28. The filamentary material 26 may be pre-impregnated with a resin or other suitable matrix material, or the matrix material may be applied as the filaments are applied to the mandrel. Instead of being castered, the delivery head 28 may, if desired, be rotatable about an axis. The filament winding apparatus 27 is a conventional apparatus and may, for example, be the same or similar to the 70 inch filament winding apparatus marketed by McClean Anderson, Inc. of Milwaukee, Wis. as its W-70 filament winder. The construction and operation of such a filament winding apparatus is commonly known to those of ordinary skill in the art to which this invention pertains and therefore will not be further described herein.

Attached to one end of the carriage 24 by means of brackets or connecting members 40 is a platform 42 which is either cantileverly mounted or suitably supported on the ways 22 to move up and down the ways as the carriage 24 is moved along the ways. In order to provide the versatility of filament winding and tape laying on the mandrel 12 for a low cost high production rate without the necessity of the time consuming movement of the mandrel between a filament winding machine and a tape laying machine and the associated risk of dropping the mandrel, in accordance with the present invention there is provided tape laying apparatus 44 which is mounted on the platform 42 by a plurality of bolts one of which is illustrated at 46 or other suitable means.

Mounted on the platform 42 is a pair of tracks or cross-feed ways 48 for movement of support structure 50 and thus the tape head 52 which is attached thereto toward or away from the mandrel 12. Cross-feed is provided by ball screw 53 which is powered by motor 54 or other suitable means.

The tape laying head 52 is mounted to an L-bracket 56 which is connected to gear 58 which is in turn operated by motor 60 through gear box 62 for rotation of the gear 58 for orientation of the tape lay down or compaction roller 64 at a desired angle relative to the mandrel 12. The compaction roller 64 is provided on the end of a shaft 66 for an air cylinder 68 so as to maintain a constant force of the compaction roller against the mandrel. This compaction force may be perhaps 300 to 700 pounds for good compaction. Tape, illustrated at 70, for the tape laying apparatus 44 is provided on a spool 72 which is suitably mounted on the L-bracket 56. As the tape 70 is let out from the spool 72, it is routed around guide roller 74 to a conventional shear mechanism 76 where the tape is cut to the desired length by a suitable cutting blade (not shown) which travels across the width thereof. The tape 70 is then routed to the compaction roller 64 where it is applied to the mandrel 12 as the mandrel rotates and is compacted onto the mandrel by the constant compaction force provided by the air cylinder 68. The tape 70 has a paper backing illustrated at 78 which is removed therefrom as the tape is applied to the mandrel 12 and is passed through nip rollers 80 after which it is taken up on take-up spool 82. The compaction roller 64, air cylinder 68, spool 72, guide roller 74, shear mechanism 76, nip rollers 80, and take-up spool 82 are all mounted on the L-bracket 56. The rotation of the tape laying apparatus 44 provided by gear 58 allows the tape to be applied to the mandrel at an angle relative to the axial direction of the mandrel, i.e., the direction of the shaft 14, which is equal to at least about plus or minus 135°.

The shear mechanism 76 is suitably adjusted to cut entirely through the tape 70 but to not cut through the paper backing 78. The application of the tape 70 to the mandrel 12 is determined by the speed of the mandrel and the speed of the movement of the carriage 24 along the ways 22. The nip rollers 80 grab the paper backing 78 to hold the tape 70 precisely in position after the compaction roller 64 has backed away from the mandrel 12 such as for cutting of the tape 70. Supply and take-up tensioning motors 84 and 86 respectively maintain tension on the supply spool 72 and take-up spool 82 respectively so that tension is maintained on the tape 70 for cutting thereof as well as at other times.

In order to lay tape 70 on flat panels, means including a pair of ways illustrated at 88 may be provided to provide vertical movement of the tape laying head 52.

The tape laying apparatus 44 is a conventional apparatus and may, for example, be the same or similar to tape laying apparatus marketed by the Ingersoll Milling Machine Company of Rockford, Ill. The construction and operation of such a tape laying apparatus is commonly known to those of ordinary skill in the art to which this invention pertains and therefore will not be further described herein.

Each tape laying apparatus 44 may cost on the order of perhaps $500,000.00. If a tape laying apparatus 44 is provided for each filament winding machine 27, it may only be used intermittently. In order to reduce the number of tape laying machines 44 required for a plurality of filament winding machines in order to save the cost of additional tape laying machines, in accordance with a preferred embodiment of the present invention the tape laying apparatus 44 is removably mounted on the platform 42 so that it may be easily removed by removing bolts 46 and mounted on a similar platform attached to another filament winding apparatus whereby the tape laying head 44 may be portable. It may only take perhaps one half an hour to one hour to move and set up the tape laying head in another machine.

It is to be understood that the invention is by no means limited to the specific embodiments which have been illustrated and described herein and that various modifications thereof may indeed be made which come within the scope of the present invention as defined by the appended claims.

We claim:

1. In apparatus for applying matrix impregnated fibrous material to an elongate mandrel generally over an entirety of the length of the mandrel which includes means for rotating the mandrel about a horizontal axis in a stationary horizontal position, track means extending generally parallel to and along the length of the mandrel, carriage means mounted on said track means for movement along said track means, and filament winding means including a filament winding head mounted on said carriage means for movement of said filament winding head along the length of the mandrel for applying filaments of fibrous material onto the mandrel, the improvement comprising platform means attached to said carriage means for movement therewith, a tape laying machine including an assembly of a tape laying head, cross-feed tracks for the tape laying head, a motor for moving the tape laying head along the cross-feed tracks, a compaction roller, a gear for orienting the compaction roller relative to the mandrel, a motor for operating the gear, means for applying a force to the compaction roller for compacting a tape on the mandrel, means for mounting a tape spool, apparatus for quiding the tape from a tape spool to the tape laying head, a mechanism for cutting the tape, means for mounting a tape backing take-up spool, and a motor for the take-up spool, and means for removably attaching said tape laying machine as a single assembled unit to said platform means whereby said tape laying machine is movable on said platform means as said carriage means is moved along said track means for movement of said tape laying head along the length of the mandrel for applying tape of fibrous material onto the mandrel and is portable, without assembling and disassembling said tape laying machine, for use with another filament winding means.

2. Apparatus according to claim 1 wherein said track means comprises parallel ways.

3. Apparatus according to claim 1 further comprising means for rotating said tape laying head for applying tape at an angle relative to an axial direction of the mandrel of at least about plus or minus 135 degrees.

4. Apparatus according to claim 1 further comprising means for moving said tape laying head vertically whereby tape may be applied to panels.

5. A method for applying matrix impregnated fibrous material to an elongate mandrel generally over an entirety of the length of the mandrel comprising the steps of:

a. rotating the mandrel about a horizontal axis in a stationary horizontal position;

b. providing on a carriage moveable on tracks horizontally along the length of the mandrel a filament winding machine including a filament winding head;

c. attaching to the carriage for movement therewith a platform;

d. removably mounting as a single assembled unit on the platform a tape applying machine including an assembly of a tape applying head, cross-feed tracks for the tape applying head, a motor for moving the tape applying head along the cross-feed tracks, a compaction roller, a gear for orienting the compaction roller relative to the mandrel, a motor for operating the gear, means for applying a force to the compaction roller for compacting a tape on the mandrel, means for mounting a tape spool, apparatus for guiding the tape from a tape spool to the tape applying head, a mechanism for cutting the tape, means for mounting a tape backing take-up spool, and a motor for the take-up spool so that the tape applying machine is portable, without assembling and disassembling said tape applying machine, for use with another filament winding machine;

e. filament winding fibrous material onto at least one portion of the mandrel from the filament winding head while moving the carriage along the length of the mandrel to move the filament winding head along the length of the mandrel; and f. applying tape of fibrous material onto at least one portion of the mandrel from the tape applying head while moving the carriage along the length of the mandrel to move the tape applying head along the length of the mandrel.

6. A method for converting a filament winding machine wherein filaments of matrix impregnated fibrous material are applied to an elongate rotating stationary horizontal mandrel generally over the entirety of the length thereof from a filament winding head and wherein the filament winding machine including the filament winding head is mounted on a carriage which is movable on tracks horizontally along the length of the mandrel for movement of the filament winding head along the length of the mandrel to a combination filament winding and tape laying apparatus, the method comprising: attaching a platform to the carriage for movement therewith along the tracks; providing a tape laying machine including an assembly of a tape laying head, cross-feed tracks for the tape laying head, a motor for moving the tape laying head along the cross-feed tracks, a compaction roller, a gear for orienting the compaction roller relative to the mandrel, a motor for operating the gear, means for applying a force to the compaction roller for compacting a tape on the mandrel, means for mounting a tape spool, apparatus for guiding the tape from a tape spool to the tape laying head, a mechanism for cutting the tape, means for mounting a tape backing take-up spool, and a motor for the take-up spool; and removably mounting the tape laying machine as a single assembled unit onto the platform for movement with the carriage of the tape laying head along the length of the mandrel and so that the tape laying machine is portable, without assembling or disassembling said tape laying machine, for use with another filament winding machine whereby fibrous material may be filament wound on the mandrel and tape of fibrous material may be laid on the mandrel alternately without repositioning the mandrel between separate filament winding and tape laying machines.

* * * * *